(12) United States Patent
Moldovan

(10) Patent No.: US 8,701,211 B2
(45) Date of Patent: Apr. 15, 2014

(54) METHOD TO REDUCE WEDGE EFFECTS IN MOLDED TRIGONAL TIPS

(75) Inventor: Nicolae Moldovan, Plainfield, IL (US)

(73) Assignee: Advanced Diamond Technologies, Inc., Romeoville, IL (US)

( * ) Notice: Subject to any disclaimer, the term of this patent is extended or adjusted under 35 U.S.C. 154(b) by 533 days.

(21) Appl. No.: 12/868,601

(22) Filed: Aug. 25, 2010

(65) Prior Publication Data

US 2011/0055987 A1    Mar. 3, 2011

Related U.S. Application Data

(60) Provisional application No. 61/237,255, filed on Aug. 26, 2009.

(51) Int. Cl.
*G01Q 60/38* (2010.01)
*G01Q 70/08* (2010.01)
*G01Q 70/10* (2010.01)

(52) U.S. Cl.
USPC ............... 850/40; 850/56; 850/57; 977/721; 977/732

(58) Field of Classification Search
USPC .......... 250/306, 307, 310; 850/21, 29, 32, 40, 850/41, 56, 57, 58, 60; 264/104, 105, 219, 264/220, 432; 977/700, 721, 732, 876, 890, 977/891, 893
See application file for complete search history.

(56) References Cited

U.S. PATENT DOCUMENTS

| | | | |
|---|---|---|---|
| 4,943,720 A * | 7/1990 | Jones | 850/57 |
| 5,107,626 A | 4/1992 | Mucci | |
| 5,152,917 A | 10/1992 | Pieper et al. | |
| 5,221,415 A | 6/1993 | Albrecht et al. | |
| 5,367,165 A * | 11/1994 | Toda et al. | 850/57 |
| 5,580,827 A | 12/1996 | Akamine | |
| 5,619,093 A | 4/1997 | Glesener et al. | |
| 5,763,879 A * | 6/1998 | Zimmer et al. | 850/3 |
| 6,076,248 A | 6/2000 | Hoopman et al. | |
| 6,793,849 B1 | 9/2004 | Gruen et al. | |
| 6,818,029 B2 | 11/2004 | Myoung et al. | |
| 6,865,927 B1 * | 3/2005 | Kley | 73/105 |
| 8,197,701 B2 * | 6/2012 | Carlisle et al. | 216/11 |
| 2007/0022804 A1 * | 2/2007 | Kley | 73/105 |
| 2009/0120904 A1 * | 5/2009 | Imada et al. | 216/41 |
| 2009/0126589 A1 * | 5/2009 | Maxwell et al. | 101/450.1 |
| 2009/0148652 A1 * | 6/2009 | Carlisle et al. | 428/80 |
| 2009/0313730 A1 * | 12/2009 | Hantschel et al. | 850/40 |

* cited by examiner

*Primary Examiner* — Bernard E Souw
(74) *Attorney, Agent, or Firm* — Edwards Wildman Palmer LLP

(57) ABSTRACT

A method of producing sharp tips useful for scanning probe microscopy and related applications is described. The tips are formed by deposition into a mold(s) formed in a sacrificial crystalline semiconductor substrate with an exposed {311} surface which has been etched with a crystallographic etchant to form a 3-sided, trihedral or trigonal pyramidal mold(s) or indentation(s). The resultant tips, when released from the sacrificial mold material or substrate, are typically formed in the shape of a trigonal pyramid or a tetrahedron. Another embodiment involves starting with a {100} surface and the formation of two tips on opposite ends of a wedge at trigonal or trihedral points of the wedge. These tips are less susceptible to the tip wedge effect typical of tips formed using known methods.

39 Claims, 15 Drawing Sheets

METHOD TO REDUCE WEDGE EFFECTS IN MOLDED TRIGONAL TIPS

CROSS-REFERENCE TO RELATED APPLICATIONS

The present application claims priority to U.S. Provisional Patent Application No. 61/237,255 filed on Aug. 26, 2009, the complete disclosure of which is incorporated by reference in its entirety.

BACKGROUND

Several industrial or scientific applications require fabrication of sharp, pointed tips composed of different materials that cannot be readily formed or etched into the required shapes at a desired level of precision. These applications include: scanning probe microscopy, field emission using emitter arrays of sharp tips, and material abrasion using arrays of sharp geometrical protrusions, etc. Known methods of forming such tips include the deposition of the desired tip material into crystallographic molds formed by patterning and subsequent etching of single crystal substrates e.g. U.S. Pat. No. 5,221,415 (Albrecht), hereby incorporated by reference in its entirety. Typical substrates for such molds in the art include single crystal <100> silicon surfaces in which "V-shaped" grooves or other shaped indentations are formed. This is followed by deposition of the desired tip material into the groove and then release of the tip structure by dissolving or removal of the Si mold or substrate. The most commonly used crystallographic etchants used to form V-grooves in silicon substrates are alkaline solutions (e.g. KOH, TMAH, etc.). These etchants and processes exploit the relative perfection of facet formation that occurs in such crystal-orientation-dependent etching processes. Such a V-groove is defined by four (111) slow etching facets forming a 4-sided pyramid with a square base as shown in the Albrecht patent. Nearly geometrically perfect 4-sided pyramidal V-grooves can be obtained if the etch is started from a perfect square or perfect circle window in the masking material, e.g. photoresist, $SiO_2$, SiN, or other masking material, often used in combination with photoresist being used to pattern a hard-mask material such as $SiO_2$, $SiN_x$. However, geometrical perfection of the openings in a masking material is limited by the precision of the patterning process. Even for the most precise and most expensive available patterning equipment (steppers or e-beam lithography) and etches used for example in the printing of contact windows in current generations of integrated circuits, the minimum X-Y mismatch for a square window is limited to about 5-20 nm. For the case of scanning probe tips, for which a desirable tip radius is in the range of below 10 nm, this level of X-Y mismatch becomes the limiting factor which determines the relative sharpness of the tip. Because of these X-Y imperfections in the mask itself, lithography process limitations (e.g. roughness of photoresist side walls), masking layer etch imperfections (e.g. residues left on the surface or slightly asymmetrical over-etching), imperfect subsequent etching of the V-groove (i.e. crystal defects, hydrogen bubbles, stirring direction, position of wafer in solution during etching), four-faceted pyramidal grooves always end in wedges, rather than a single 4-sided point. If the wedge shape (and resultant tip radius) is larger than about 20 nm, even an additional step of oxidation sharpening, e.g., as disclosed in U.S. Pat. No. 5,580,827 (Akamine), hereby incorporated by reference in its entirety, is insufficient to form a single four-pointed pyramidal mold and resultant tip after processing. FIG. 1-5 shows how such wedge-terminated oxidation-sharpened pyramidal V-grooves can lead to double-tipped probes, both points of which are quite sharp.

SUMMARY

Compositions, articles, methods of making, method of using, and other embodiments are disclosed and claimed.

One embodiment comprises a method that comprises providing a silicon wafer comprising a surface with a particular crystallographic orientation, patterning the surface, forming one or more pyramidal indentations or molds on the surface, depositing a tip or mold filling material in the indentation to form a tip conforming to the indentation or mold, and separating the tip from the indentation or mold, where the tip has radius less than 100 nm or less than 20 nm. In some embodiments, the surface comprises a {311} crystallographic orientation. In some embodiments, the surface comprises a {311}, {411}, or {511}, etc., crystallographic orientation. The mold or tip filling material may comprise silicon nitride, silicon carbide, nanocrystalline diamond, ultrananocrystalline diamond, or some other material such as various metals (e.g. tungsten, molybdenum, and the like and their alloys) that is resistant to an etchant for silicon dioxide or silicon. Such a material may be electrically conductive. It may comprise boron or nitrogen doped conductive diamond. In some cases, the tip is a scanning probe microscopy tip or a field emission tip. Such a tip may form part of an array of tips. Some embodiments may further comprise forming a cantilever on the silicon wafer, where the tip is in contact with the cantilever. The tip may overlap an end of the cantilever. Other embodiments may comprise forming a layer of silicon dioxide inside the indentation of the mold. In some cases, the patterning may comprise depositing a hard mask material.

Another embodiment comprises providing a silicon wafer comprising a surface with a {100} crystallographic orientation, patterning the surface, forming an indentation in the surface, forming a wedge-shaped mold in the indentation, forming an oxide layer in the shape of 3-faceted or trihedral mold point in the wedge-shaped mold, depositing a tip or mold filling material into the mold to form a trigonal pyramidal tip at the trihedral point of the wedge-shaped mold, and separating the so-formed tip from the mold. In some cases, the tip has a radius of less than 100 nm or less than 20 nm. The mold or tip filling material may comprise silicon nitride, silicon carbide, nanocrystalline diamond, ultrananocrystalline diamond, or some other material that is resistant to an etchant for silicon dioxide or silicon. Such a material may be electrically conductive. It may comprise boron or nitrogen doped conductive diamond. In some cases, the tip is a scanning probe microscopy tip or a field emission tip. Such a tip may form part of an array of tips. Some embodiments may further comprise forming a cantilever on the silicon wafer, where the tip is in contact with the cantilever. The tip may overlap an end of the cantilever.

Still another embodiment comprises an article comprising a cantilever with a wedge-shaped top, where the top comprises two facets each bordered by one triangular facet sharing an apex or trihedral point. Such an article further comprises two trigonal pyramidal tips disposed on the two facets, where at least one of the tips has a tip radius of less than 100 nm or less than 20 nm. In such an article, the length of the cantilever will be larger than its width, in some cases at least 50% larger or at least twice as large. The tips may be electrically conductive. In some cases, the cantilever may be disposed on an object with an indentation, where at least a part of the cantilever is in the indentation. One of the tips may be entirely contained within the indentation.

Yet another embodiment comprises an article comprising a layer of diamond disposed on a surface, with a plurality of trigonal pyramidal geometrical protrusions disposed on the layer. The protrusions may have a density between 10,000 per square centimeter to 10,000,000 per square centimeter, or between 1,000,000 and 5,000,000 per square centimeter. The protrusions may have a tip radius between 0.1 µm and 2.0 µm, or between 0.2 µm and 1.0 µm.

Yet still another embodiment comprises a method comprising selecting sizes, placements, densities, and tip radii for a plurality of trigonal pyramidal tips, providing a silicon wafer to provide a sacrificial mold surface, with a surface having a particular crystallographic orientation, forming pyramidal indentations or molds on that surface, depositing a layer of tip or mold filling material comprising two opposing surfaces and comprising diamond into the indentation or mold to form a tip conforming to the indentation or mold, adhering a backing or mounting layer to a surface of the tip or mold filling layer not in contact with the mold and separating the tip from the indentation or mold. In such an embodiment, at least one of the size or placement or density or tip radius of the formed tips is selected to achieve a desired abrasion rate for the article. The tip radius can be, for example, 100 nm-50 µm, such as 500 nm-10 µm. In some embodiments, the average tip radius may be greater than 100 nm and less than 2.0 µm, or between 200 nm and 1.0 µm. The density of tips may be between 10,000 per square centimeter and 10,000,000 per square centimeter, or between 1,000,000 and 5,000,000 per square centimeter. In some cases, the tip or mold filling material comprises ultrananocrystalline diamond. The diamond tip or mold filling layer may typically have an average grain size of less than about 10 nm may be preferable so as to improve the mold filling capability of the layer but larger grain sizes of 10-100 nm or greater may also be used.

These and other embodiments can be used in industrial and scientific applications requiring articles with sharp, pointed tips. Such applications include use as field emitter tips or atomic force microscopy tips, use in abrasive applications such as chemical mechanical planarization, and the like. Those skilled in the art will understand how to make and use these and other embodiments from the disclosure contained herein.

DETAILED DESCRIPTION

All references are incorporated by reference in their entirety. No admission is made that any reference is prior art.

Priority U.S. Provisional Patent Application No. 61/237,255 filed on Aug. 26, 2009, is incorporated by reference in its entirety including figures, examples, and claims and all other sections of the application.

Fabrication Methods

Figure 1:
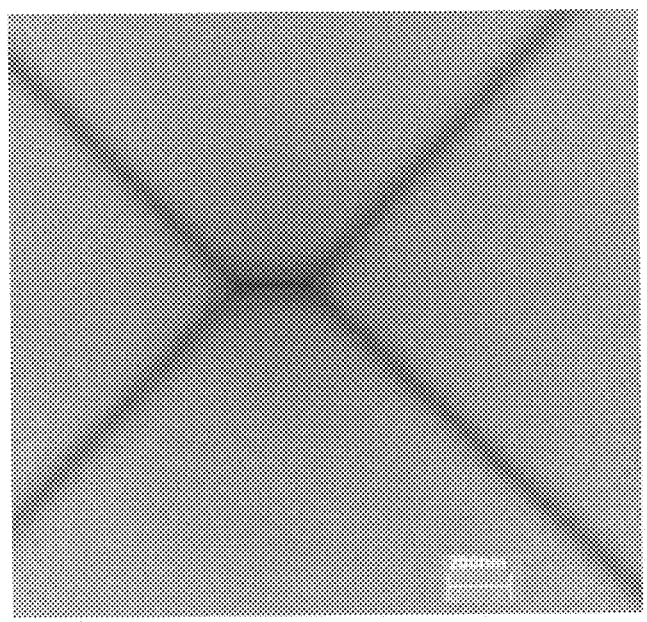
FIG. 1 depicts a top view of a v-groove mold with a wedge-shaped bottom.
Figure 2:
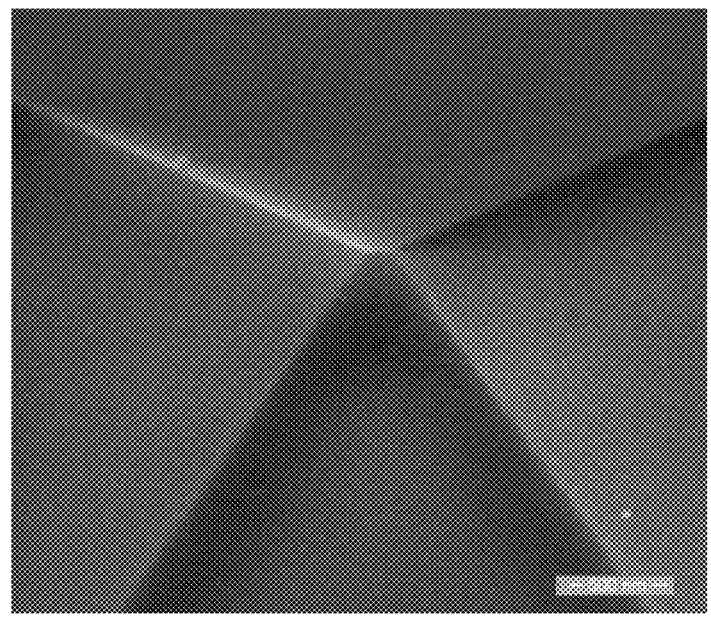
FIG. 2 depicts an ultrananocrystalline diamond (UNCD) tip that had been molded in an unsharpened v-groove mold with a wedge-shaped bottom.
Figure 3:
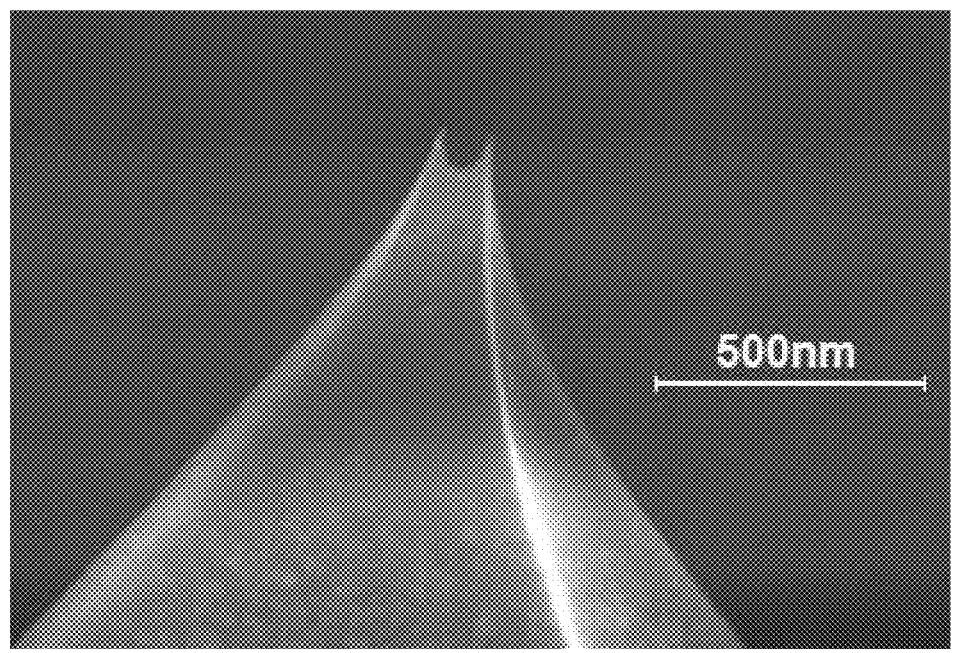
FIG. 3 depicts a molded UNCD tip that has been oxidation-sharpened.
Figures 4A, 4B:
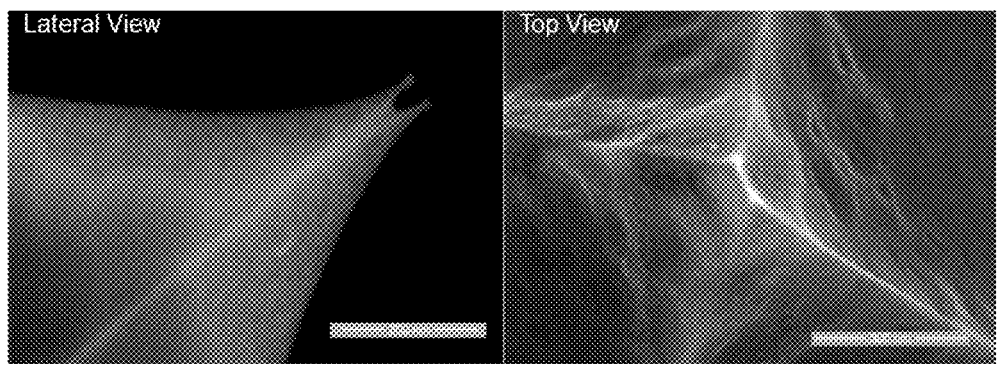
FIG. 4A is a lateral view of the tip of FIG. 3.
FIG. 4B is a top view of the tip of FIG. 3.
Figure 5:
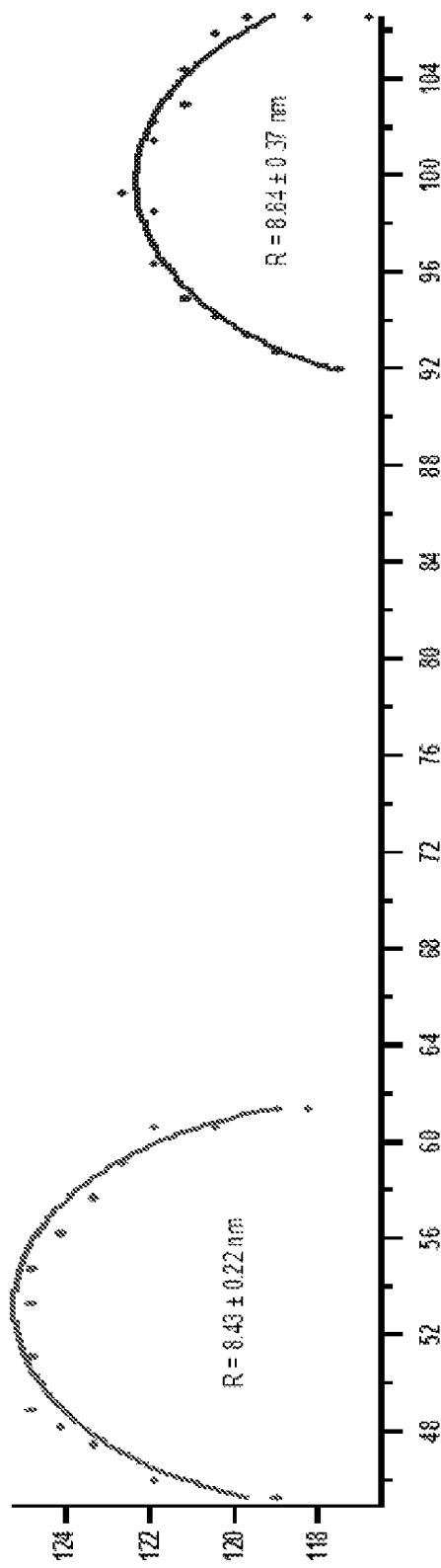
FIG. 5 summarizes the results of image processing of FIG. 4. The two tip radii of curvature are approximately 8 to 9 nm.
Figure 6A:
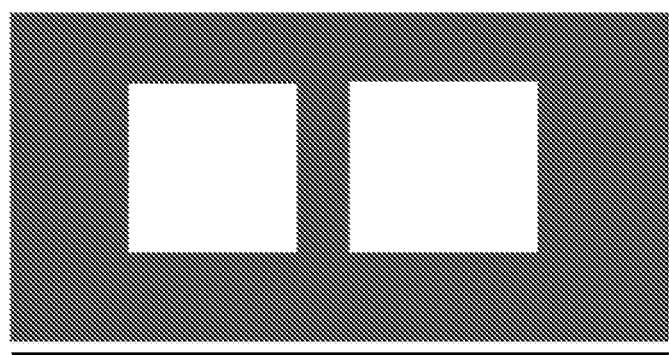
FIG. 6A depicts a square mask and a rectangular mask.
Figure 6B:
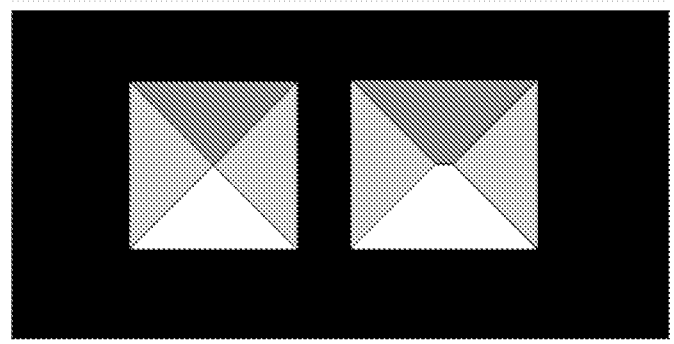
FIG. 6B depicts a four-sided pyramidal tip made using a square mask and a wedge-shaped tip made from a rectangular mask.
Figure 7A:
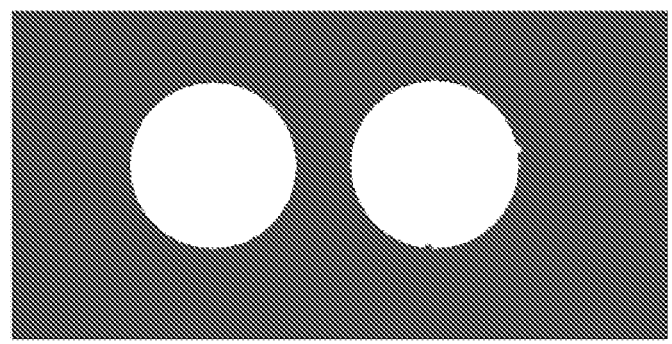
FIG. 7A depicts a circular mask and a near-circular mask having imperfections.
Figure 7B:
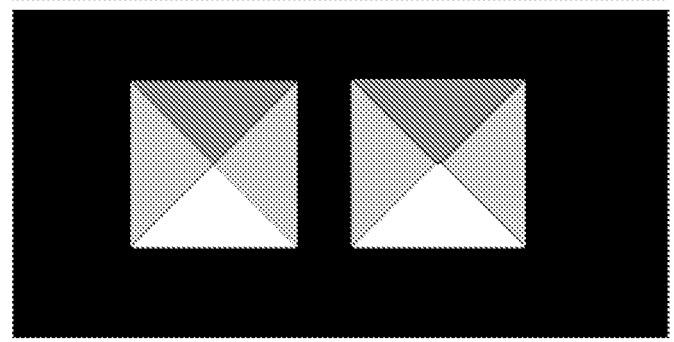
FIG. 7B depicts a four-sided pyramidal tip using a circular mask and a wedge shaped tip made from a near-circular mask having imperfections.
Figure 8:
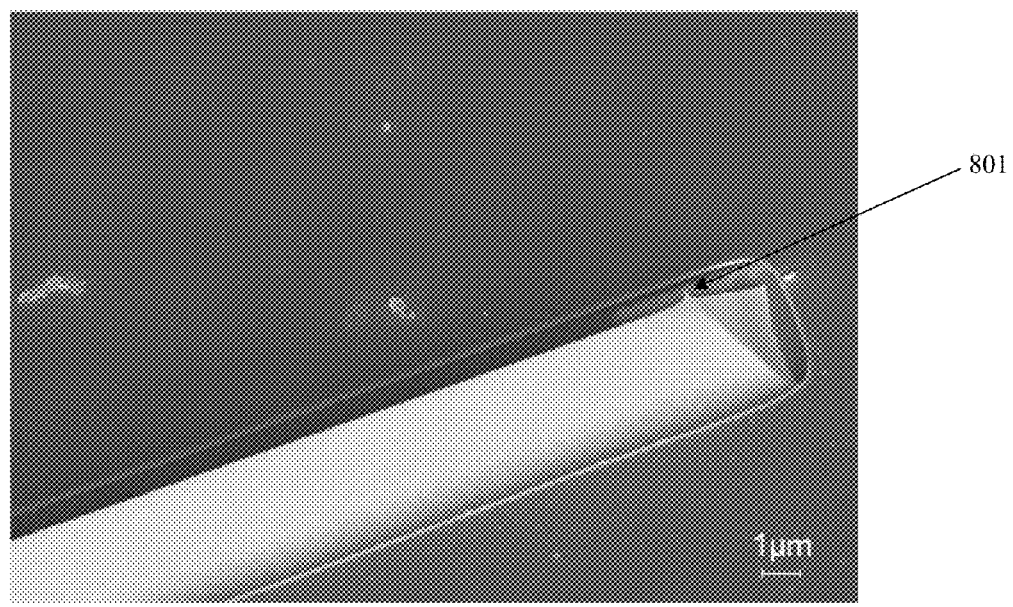
FIG. 8 depicts an UNCD structure that had been molded in an oxidation sharpened wedge-like v-groove in a <100> silicon substrate. Tip 801 is formed at the junction of three (111) facets.
Figure 9:
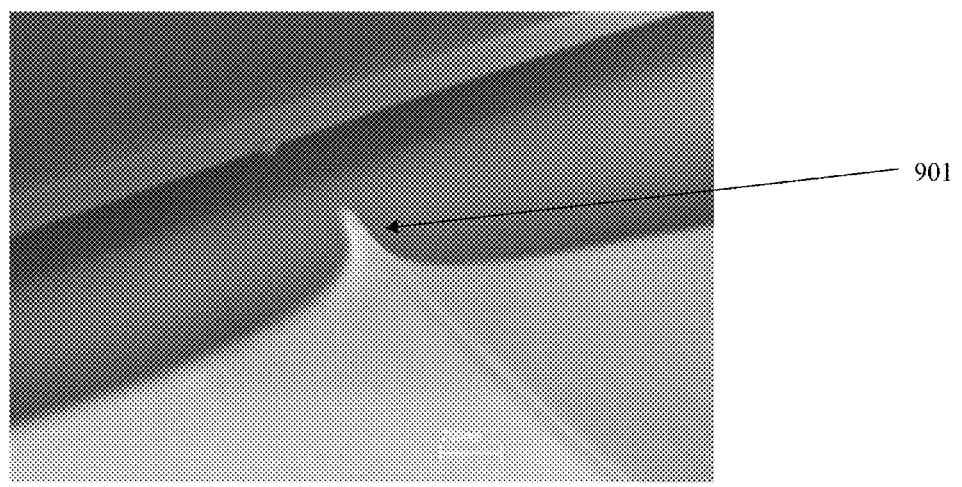
FIG. 9 depicts a higher magnification view of FIG. 8. Tip 901 is about 250-300 µm high with a tip radius of about 10 nm. The tip comprises an approximately 1 µm layer of silicon oxide used for subsequent sharpening.
Figure 10:
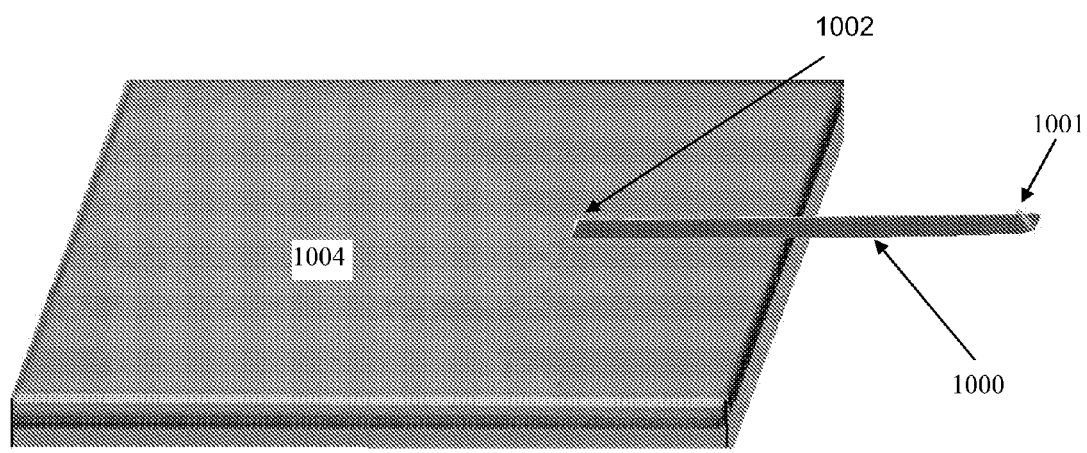
FIG. 10 illustrates a cantilever probe with wedge shape 1000, probe tip 1001, non-probing tip 1002 that is in a recessed area of handling chip 1004.

The reason for the formation of wedge-shaped tips in the art is that the four (111) faceted V-grooves that are formed from this method cannot in practice be used to produce tips with a single perfect 4-sided pyramidal point. An alternative method that has the potential to produce single pointed tips is the formation of trihedral, trigonal or 3-faceted geometrical features or molds, instead of the 4-faceted features or molds of the art. A trigonal or trihedral facet can be produced from a rectangular masking feature with one dimension of the rectangle designed to be much larger than the other (see FIGS. 8 and 9). In an un-sharpened configuration (i.e. without oxidation sharpening), this would produce a long wedge-like tip without much utility, but after oxidation sharpening (FIG. 8, 9) this leads to a single trihedral, trigonal or 3-faceted tip (or sharp tip) at the termination of the rectangle. Based on these results, several methods can be used to fabricate single-pointed 3-faceted (or sided) probe tips:

The first method uses a Si <100> substrate wafer, from which a long wedge-shaped structure may be produced (preferably as part of a cantilever). This can be followed by an oxidation sharpening step which can produce tips at either end of the long wedge-shaped structure. One of the oxidation sharpened tips on the end of the wedge can be used as a probe for scanning or analysis of a surface or other purpose. In some embodiments, the other tip at the other end of the wedge is sufficiently remote from the probe tip so that it need not interfere with the scanning/probing activity. One embodiment of the sharp tips produced using this method is shown in FIG. 10, in which the entire cantilever is wedge-shaped and the tip at the other and of the wedge is situated over top of a larger handling chip. This arrangement allows the scanning or probe tip on the end of cantilever to engage or examine a target surface when the cantilever arm is angled towards the surface while the other tip on the handling chip is relatively distant from any surface and therefore it need not interfere with the scanning or probing process. The dimensional size of the long axis of the cantilever (length) is preferably at least 50% larger as compared to the short axis of the cantilever (width) or more preferably two times larger or more.

Other configurations using this general method are also possible. For example, only a portion of the cantilever could be wedge-shaped, or the mold V-groove could contain an elongated wedge (or edge), of sufficient length to localize the second (non-probing) tip sufficiently remote so that it need not interfere with the probing function provided by the first (probe) tip. Alternatively, the second non-probing tip can be formed on a cantilever that is recessed in a handling chip so that the tip does not protrude above the surface of the handling chip and is therefore not subject to wear or destruction and does not interfere with a scanning process. This is also approximately illustrated by the cantilever with 2 tips shown in FIG. 10. The $2^{nd}$ tip can optionally be destroyed or abraded so as to leave only the probe tip and prevent interference from the $2^{nd}$ tip. Finally, the $2^{nd}$ (non-probing) tip can be used as a replacement for the $1^{st}$ probing tip if the cantilever is later removed, and then rotated 180 degrees so the former non-probing tip could then be used as a probing tip.

Figure 11:
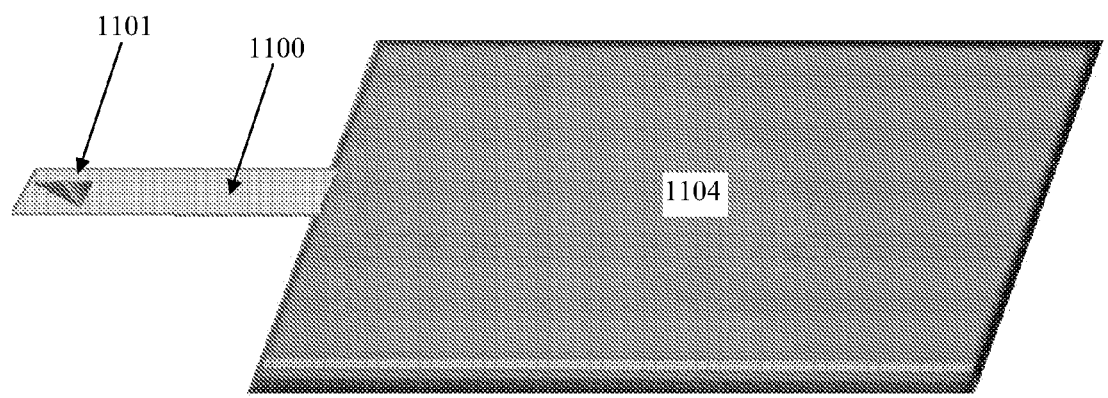
FIG. 11 illustrates a probe comprising wafer 1100 attached to handling chip 1004. Trigonal pyramid tip 1101 is formed from the intersection of three (111) facets.

Another method uses a specially-cut Si wafer substrate of approximate orientation (h11), (hkk, where h>k), preferably {311}, to generate 3-sided, trigonal or tetrahedral V-groove pyramids, which, after being oxidation sharpened, produce a trihedral or trigonal single-pointed tip that can be optionally integrated at the end of a cantilever. A conceptual diagram of this method is shown in FIG. 11.

Figure 12:
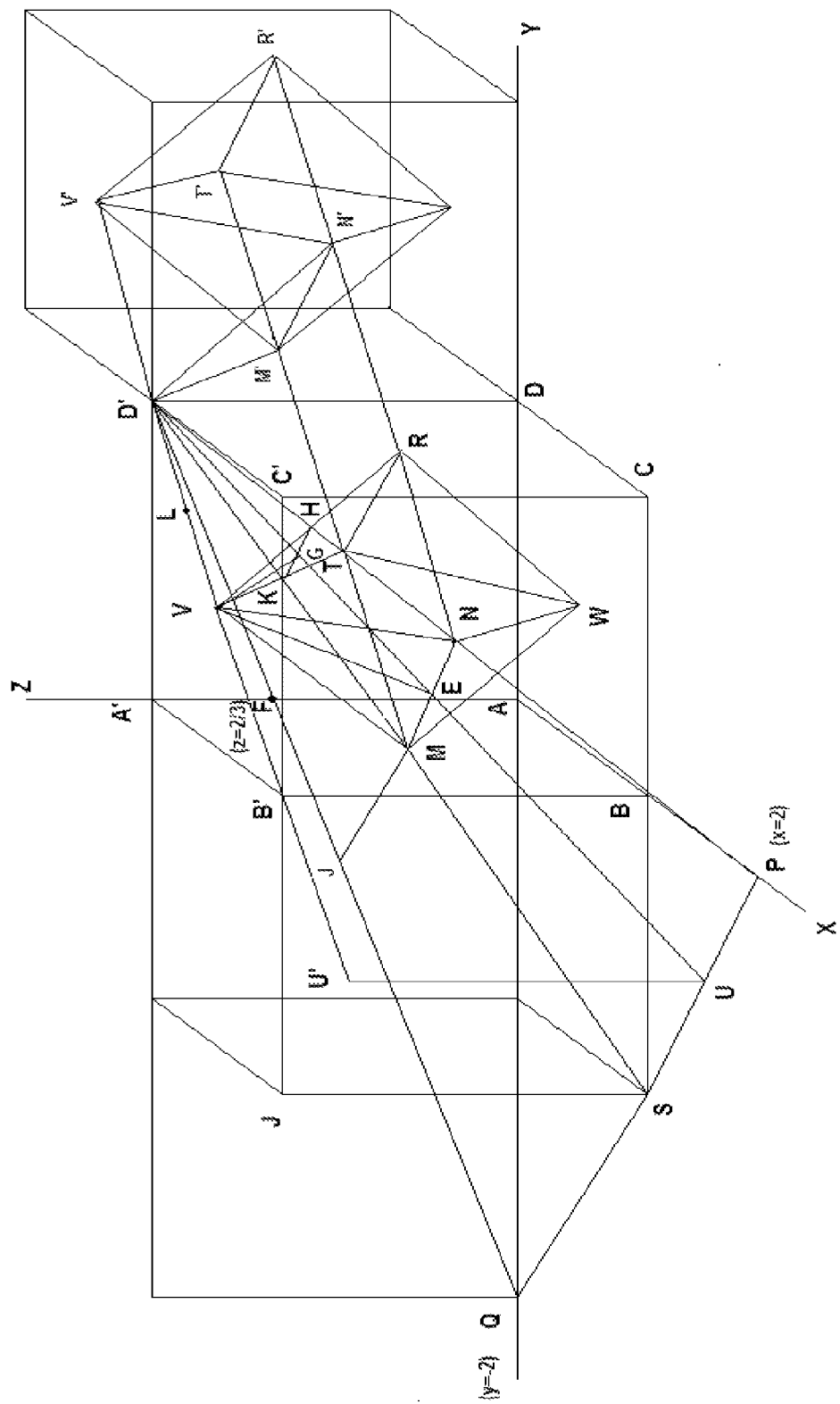
FIG. 12 depicts crystallographic planes useful for generation of trigonal pyramid molds. VMND' is one such pyramid, where the MND' face is in the {311} plane. Other pyramids include VLMN, where L is any point on the line segment between V and V'.
Figure 13:
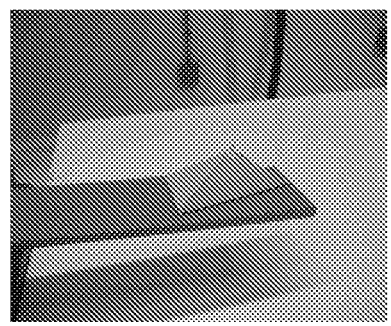
FIGS. 13, 14, and 15 depict models of cantilevers with trigonal pyramids, each of which had been molded from a trigonal pyramidal mold having a {311} face.
Figure 14:
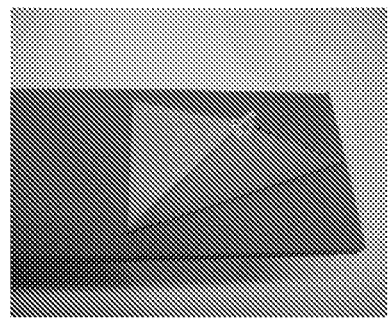
Figure 15:
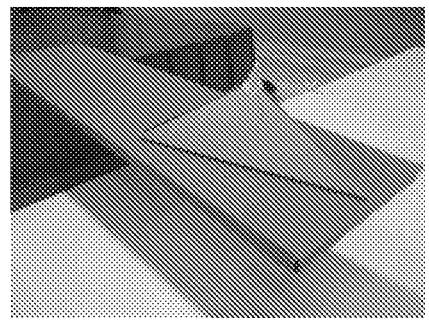

To produce different trigonal pyramidal probe tip shapes, various substrate surface orientations can be used, among which are those obtainable from wafers cut parallel to the family of (hkk) planes (where h>k), such as the crystallographic planes {311} and {522}. The {311} plane provides maximum symmetry, and produces trigonal pyramidal tips with all edges of the sides of the facets of the tip of the same length. The configuration of V-groove-based pyramids obtainable from the (hkk) family of substrate surface orientations is shown in FIG. 12, where one can obtain the family by gliding the point L along the line VV', and joining the point L with the points M and N. The {311} configuration (embodied in the figure as the (1, −1, 3) plane) is obtained for L=D'.

Since the substrate material for these trigonal pyramidal structures is generally sacrificial, it is possible to use other crystalline materials with well controlled crystal orientations (e.g. other semiconductors like GaAs, InP, AlGaAs, and similar compound semiconductors) to produce crystallographically etched trigonal or trihedral structures. However, the use of Si as a substrate has the benefit of being generally cheaper and more readily available than any other semiconductors and since the formation of an oxide layer on the surface produces the sharpened tip mold features useful to produce sharp probe tips for scanning probe applications and the like.

Figure 16A:
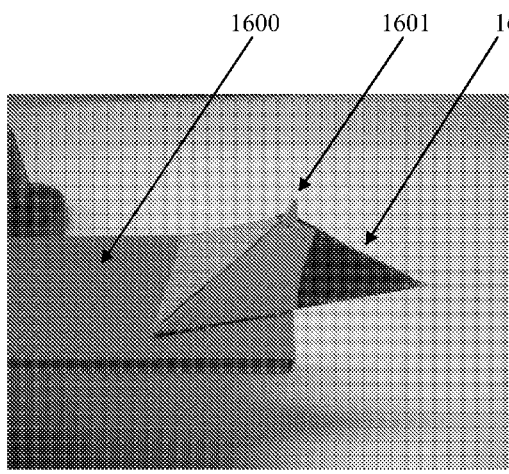
FIGS. 16A and 16B are perspective views of models of probe tip 1601 placed near the end of cantilever 1600. The overhanging portion 1602 is later etched away.
Figure 16B:
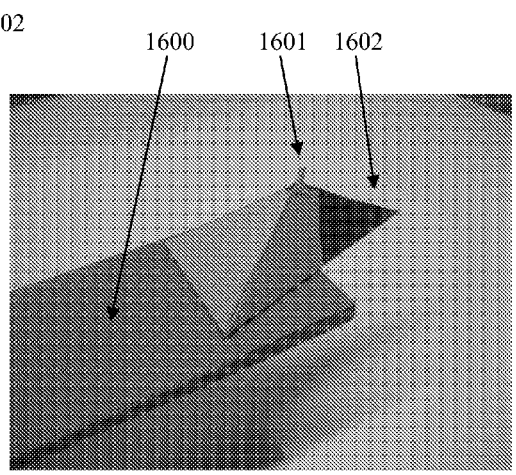
Figure 17A:
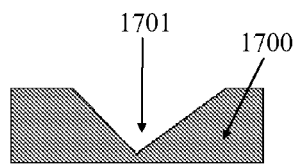
FIG. 17A depicts V-groove 1701 on silicon {311} substrate surface 1700.
Figure 17A:
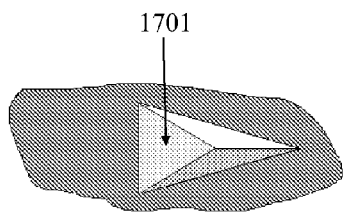
Figure 17B:
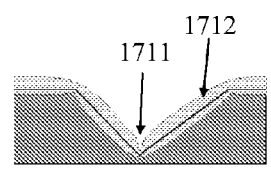
FIG. 17B depicts oxide layer 1712 that has been oxidation sharpened to form tip 1711 with a smaller radius of curvature.
Figure 17B:
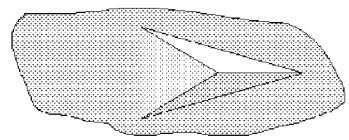
Figure 17C:
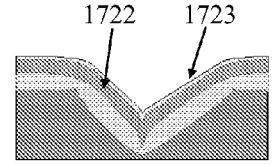
FIG. 17C depicts deposited tip structural material 1722 and hard mask 1723. Material 1722 may be UNCD.
Figure 17C:
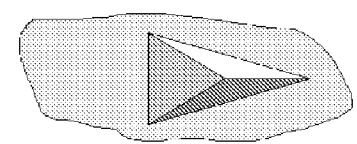
Figure 17D:
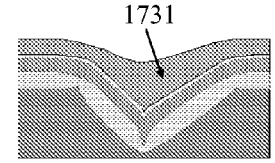
FIG. 17D depicts spin coated material 1731. Material 1731 may be a photoresist or some other planarizable material.
Figure 17D:
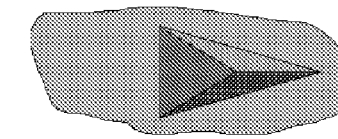
Figure 17E:
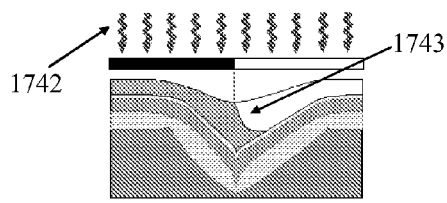
FIG. 17E depicts aligning mask 1741 over trigonal tip mold, exposure 1742 and developing to form "foot" 1743.
Figure 17E:
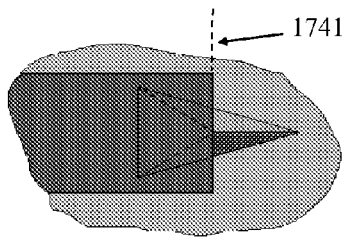
Figure 17F:
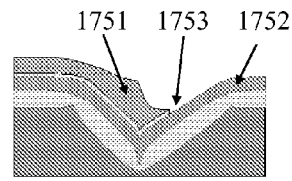
FIG. 17F depicts exposure of tip structural material 1752 via etching. Also shown are photoresist 1751 and hard mask layer 1753.
Figure 17F:
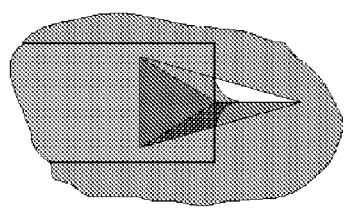
Figure 17G:
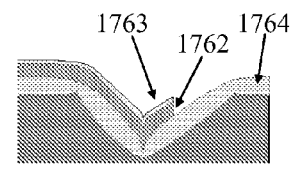
FIG. 17G depicts etching of the tip structural material 1762 using the patterned hard mask layer 1763, thereby exposing oxide 1764.
Figure 17G:
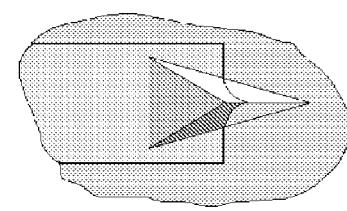

FIGS. 16A and 16B show an embodiment wherein the trigonal pyramid is placed at the end of the cantilever, with a portion of the pyramid extending beyond the end of it. Such a configuration can be obtained by using a combination of masked lithography (to form the rectangularly shaped cantilever) with self-aligned lithography based on the thicker photoresist present in the V-groove or mold for the tip which can cover only a portion of the cantilever cross-sectional area. Such a tip configuration has an advantage that the tip may be situated closer to the end of the cantilever, which can allow for easier access to sample surfaces without interference from extraneous portions of the cantilever that are encountered in the art. In one embodiment, the tip is situated very close to the end of the rectangular portion of the cantilever, and the only part extending horizontally out from the cantilever being the remainder of the triangular-shaped or trigonal pyramid. In FIGS. 16A and 16B, the portion of the trigonal pyramid that is to be removed is highlighted in black. Alternative shapes for the cantilever on which the trigonal pyramidal tip is mounted are possible, including triangular, T-shaped and other shapes without departing from the spirit of the invention. Another example of a fabrication method is illustrated in FIG. 17*a-g*. FIG. 17*a* shows a trigonal pyramidal or trihedral V-groove 1701 etched into Si {311} substrate 1700 using KOH through a patterned SiO$_2$ mask, after the removal of the SiO$_2$ (not shown). FIG. 17*b* illustrates the oxidation sharpening process with the formation of an oxide layer 1712 to produce a tip 1711 with a radius that can be less than 100 nm, more preferably less than 20 nm and even more preferably in the range of 8-10 nm. Typical oxide layer thicknesses are ~1-2 μm. Next (FIG. 17*c*), the tip structural material 1722 is deposited (e.g. diamond or more preferably UNCD, of typical thickness 0.1 to 5 μm), with a PECVD oxide or evaporated Cr layer as a hard mask 1723 on top with typical thickness of 0.05-0.5 μm. FIG. 17*d* shows the same structure covered with a layer of at least partially planarizing photoresist 1731. Typical photoresist thicknesses are in the range of 1-7 μm. Next (FIG. 17*e*), a mask is used to expose the photoresist, to delineate the cantilever. In some embodiments, the edge of the cantilever as it is designed in the mask material is aligned (process step 1741) and exposed (process step 1742) to be just above or somewhat wider than the designed point of the oxidation sharpened tip, with a placement (or alignment) accuracy using relatively inexpensive lithography tools of about ±1 μm, the cantilever will usually extend somewhat beyond the base of the tip in the final inverted configuration for probing. Development of the photoresist usually leaves behind a "foot" of photoresist (1743) and a corresponding portion of the base of the trigonal pyramid extending in the lateral direction, covering the tip (to provide its base) which extends in the vertical direction. Since the photoresist (or other planarizable material, e.g. polyimide) may be planarizable, it can be thicker in the trihedral or trigonal pyramidal mold or indentation. The development process for photoresist usually leaves wider features (less photoresist is removed by the development process) where the photoresist is thicker. Therefore, if the edge of the cantilever pattern coincides with the point of the tip, the photoresist development process for the thicker photoresist above the point of the tip in the mold or indentation will tend to increase the width of the feature and increase the overlap of the cantilever beam with the tip that protrudes from it. This wider feature size for development of a photoresist layer in a deep feature (the tip mold) is depicted in FIG. 17e+f.

Figure 17H:
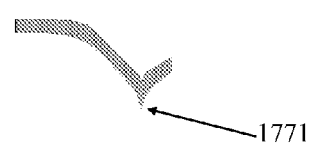
FIG. 17H depicts the final sharpened tip 1771 formed by releasing of the cantilever from the substrate material.
Figure 17H:
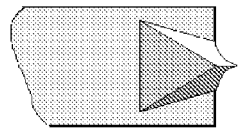

In some embodiments, this mask edge can be designed to be located relatively distant from the oxidation sharpened tip as long as the tip is covered by the cantilever in the final device. Subsequently (FIG. 17f), this photoresist 1751 is used as a mask to selectively etch the hard mask layer 1753 of (e.g. $SiO_2$ or Cr), by Reactive Ion Etch (RIE) or by wet etch to uncover of a portion of the tip structural material 1752. Then the pattern is transferred by selective RIE or Inductively Coupled Plasma (ICP) RIE into the probe tip structural layer 1762 (FIG. 17g) using the hard mask layer 1763 as a masking material and to uncover a portion of the underlying oxide layer 1764. The tip structural layer may comprise UNCD. After completing the probe fabrication process using known methods, e.g. bonding a pre-diced Pyrex body to the CMP planarized Si wafer, and dicing the Pyrex for handling chip delineation, the cantilever can be released by dissolving the Si wafer substrate and removing the oxide with Buffered Oxide Etch (BOE) as shown in FIG. 17h to form the released sharpened tip 1771.

The Use of Molded Trigonal Pyramids as Field Emitter Tips

The inventive method may be used to fabricate an individual field emitter tip or an array of field emitter tips. Such tips are described in U.S. Pat. No. 5,619,093 (Niedermann), hereby incorporated by reference in its entirety. The tip material used in electron field emission applications is preferably electrically conductive. When using the preferred diamond material (more preferably UNCD), the diamond will therefore require a dopant that enhances the emissive properties (e.g. boron or nitrogen as shown for example in U.S. Pat. No. 6,793,849—Gruen which is hereby incorporated by reference in its entirety). For field emission purposes, the trigonal pyramidal tip formation method described above in various embodiments can be used to form precisely placed and shaped field emission tips with a radius of less than 100 nm and even more preferably less than 20 nm. The use of the oxidation sharpening technique described above may be utilized to form sharper tips to achieve a greater degree of field enhancement for emission and as a result to provide an enhanced emission current for applications that benefit from high field emission currents.

One of the advantages of the use of the inventive method for emitter tips is that the tips can be precisely placed with a high areal density that is advantageous for arrays of field emitters for which a high overall current density is desired or required.

Alternative Abrasive Embodiment Utilizing Molded Trigonal Pyramids

The use of diamond for abrasive applications is well known, see e.g. U.S. Pat. No. 5,107,626—Mucci, herein incorporated as reference. Structured abrasive structures are also known in the art, e.g. U.S. Pat. No. 5,152,917—Pieper and U.S. Pat. No. 6,076,248—Hoopman, both of which are hereby incorporated by reference in their entirety. The inventive method may be used to produce multiple molded trigonal pyramidal structures for structured abrasive applications. A possible application for such arrays of molded structures would be for Chemical Mechanical Planarization (CMP) pad conditioning heads, e.g. U.S. Pat. No. 6,818,029—Myoung, hereby incorporated by reference in its entirety, or other demanding abrasive applications for which precise control of the abrasive properties, long abrasive wear life, and exceptional hardness are required.

CMP pad conditioning heads typically have large numbers of randomly placed abrasive structures (or geometrical protrusions) that are spaced apart by about 10-50 μm, i.e. a density of abrasive structures ~40,000/$cm^2$ to ~1,000,000/$cm^2$. In some other examples, the spacing is about 10-500 μm, i.e., a density of abrasive structures ~10,000/$cm^2$ to ~1,000, 000/$cm^2$. Note that in conventional abrasive applications "abrasive structures" are commonly referred to as "grit". To more clearly specify abrasive properties of an abrasive surface and produce a long-life abrasive surface, a set of molded trigonal pyramids using the inventive method with designed spacing and size and tip sharpness can be used. The inventive method of mounting molded trigonal pyramidal structures on a surface can be used to increase the density of molded abrasive structures as compared to the typical abrasive. These trigonal pyramidal structures can be placed every few microns, e.g. ~3-10 μm, equivalent to a density of abrasive structures on the surface of ~1,000,000 to 10,000,000/$cm^2$, and produce an abrasive surface with many such molded structures in specific or designed locations with specified or designed array locations. These arrays of precisely located and sized trigonal pyramids can produce a surface with more tightly specified abrasive properties for a given application than that known in the art. The density of abrasive structures (or trigonal pyramidal protrusions) can also be increased reproducibly to a very high level which may also be advantageous as compared to that known in the art. The trigonal pyramidal structures for abrasive applications preferably comprise diamond and more preferably comprise ultrananocrystalline diamond (UNCD).

For some abrasive applications, especially those for which a longer abrasive life is desired, the oxidation sharpening method of the inventive method can be modified to reduce the radius of the resulting mold and resulting tips generated from tip structural material deposited in the mold. The growth of an oxide layer on a sharp feature is known to reduce the relative sharpness of the feature in the substrate material (whether the feature is an indentation or protrusion) since the oxide grows more quickly on less restricted areas and less quickly on more restricted areas. Specifically, the oxide layer can be grown and then removed prior to deposition of the tip structural material which rounds or "de-sharpens" the mold feature. After this "de-sharpening" step, deposition of an abrasive material (preferably comprising diamond and more preferably comprising UNCD), can be performed to produce molded trigonal pyramidal abrasive structures. The resulting de-sharpened molded trigonal pyramidal abrasive structures preferably have tip radii in the range of 100 nm to 50 μm, such as 100 nm to 2 μm or more preferably in the range of 200 nm to 1 μm.

It should be noted that the crystallographic orientations useful to produce the structures described above, may be used in orientations slightly altered from the precise geometrical angles of the crystallographic orientations, as designed or to account for errors in wafer cut from the ideal crystallographic orientations. Slightly altered orientations within about plus/minus 5 degrees of the precise geometrical orientations are preferred.

What is claimed is:
1. A method comprising:
   providing a silicon wafer comprising at least one surface comprising an {hkk} crystallographic orientation, wherein h is greater than k and {hkk} is not {100};
   patterning said surface to form a patterned surface;

forming at least one triangular pyramidal indentation or mold on the patterned surface;

depositing tip or mold filling material into the indentation or mold to form a tip, wherein the tip or mold filling material conforms to the shape of the indentation or mold;

separating the tip from the indentation or mold, wherein the tip has a tip radius less than 100 nm.

2. The method of claim 1, wherein the surface comprises a {311} crystallographic orientation.

3. The method of claim 1, wherein the mold or tip filling material comprises silicon nitride, silicon carbide, nanocrystalline diamond, or ultrananocrystalline diamond, or a metal or alloys thereof.

4. The method of claim 1, wherein the mold or tip filling material is resistant to an etchant for silicon dioxide or silicon.

5. The tip formed by the method according to claim 1, wherein the tip is a scanning probe microscopy tip.

6. The method of claim 1, further comprising forming a cantilever on the silicon wafer, wherein the tip is in contact with the cantilever.

7. The method of claim 6, wherein the tip overlaps an end of the cantilever.

8. The method of claim 3, wherein the mold or tip filling material is electrically conductive.

9. The method of claim 8, wherein the mold or tip filling material comprises boron or nitrogen doped conductive diamond.

10. The tip made according to the method of claim 1, wherein the tip is a field emission tip.

11. The tip according to claim 10, wherein the tip forms a part of an array of tips.

12. The method of claim 1, further comprising forming a layer of silicon oxide inside the indentation or mold.

13. The tip made according to the method of claim 1, wherein the tip radius is less than 20 nm.

14. The tip made according to the method of claim 1, wherein the tip is an atomic force microscopy tip.

15. The method of claim 1, wherein said patterning comprises depositing a hard mask material.

16. A method comprising:
providing a silicon wafer comprising at least one surface comprising a {100} crystallographic orientation;
patterning the surface to form a patterned surface;
forming at least one indentation in said patterned surface;
forming at least one wedge-shaped mold in said indentation, said wedge-shaped mold comprising at least one 3-faceted mold point;
forming an oxide layer inside the 3-faceted mold point;
depositing a tip or mold filling material into the wedge-shaped mold to form a trigonal pyramidal tip;
separating the tip from the mold.

17. The method of claim 16, wherein the mold or tip filling material comprises silicon nitride, silicon carbide, nanocrystalline diamond, or ultrananocrystalline diamond, or a metal or alloys thereof, or other material with an etch selectivity to any etchant for $SiO_2$ or silicon.

18. The method of claim 16, wherein the mold or tip filling material is resistant to an etchant for silicon dioxide or silicon.

19. The tip formed by the method of claim 16, wherein the tip is a scanning probe microscopy tip.

20. The method of claim 16, further comprising forming a cantilever on the silicon wafer, wherein the tip is in contact with the cantilever.

21. The method of claim 20, wherein the tip overlaps an end of the cantilever.

22. The method of claim 17, wherein the mold or tip filling material is electrically conductive.

23. The method of claim 22, wherein the mold or tip filling material comprises boron or nitrogen doped conductive diamond.

24. The tip formed according to the method of claim 16, wherein the tip is a field emission tip.

25. The tip according to claim 24, wherein the tip forms a part of an array of tips.

26. The method of claim 16, wherein the oxide layer forms a sharpened mold surface.

27. The tip formed according to the method of claim 16, wherein the tip radius is less than 20 nm.

28. The tip formed according to the method of claim 16, wherein the tip is an atomic force microscopy tip.

29. The method of claim 16, wherein said patterning comprises depositing a hard mask material.

30. An article comprising a trigonal pyramidal tip comprising conductive diamond and a tip radius of less than 100 nm.

31. The article of claim 30 comprising ultrananocrystalline diamond.

32. The article of claim 30, wherein the tip radius is less than 20 nm.

33. An article comprising:
a cantilever comprising a length and a width and a wedge-shaped top, wherein the top comprises a first facet and a second facet disposed thereon, said first and second facets each comprising three triangular surfaces sharing an apex; and
a first trigonal pyramidal tip and a second trigonal pyramidal tip, said first trigonal tip disposed on said first facet and said second trigonal pyramidal tip disposed on said second facet, wherein at least one of the first and second tips comprises a tip radius less than 100 nm;
wherein the length of the cantilever is at least 50% larger than the width of the cantilever.

34. The article of claim 33, wherein the tips comprise ultrananocrystalline diamond.

35. The article of claim 33, wherein the tips are electrically conductive.

36. The article of claim 33, wherein said tip radius is less than 20 nm.

37. The article of claim 33, wherein the length of the cantilever is at least two times greater than the width of the cantilever.

38. The article of claim 33, wherein the cantilever is disposed on an object, said object having an indentation, wherein at least part of the cantilever is in said indentation.

39. The article of claim 38, wherein at least one of said first or second trigonal pyramidal tips is contained within said indentation.

* * * * *